J. F. WHITMAN.
BREAKING CART.
APPLICATION FILED MAY 14, 1909.
967,473.
Patented Aug. 16, 1910.
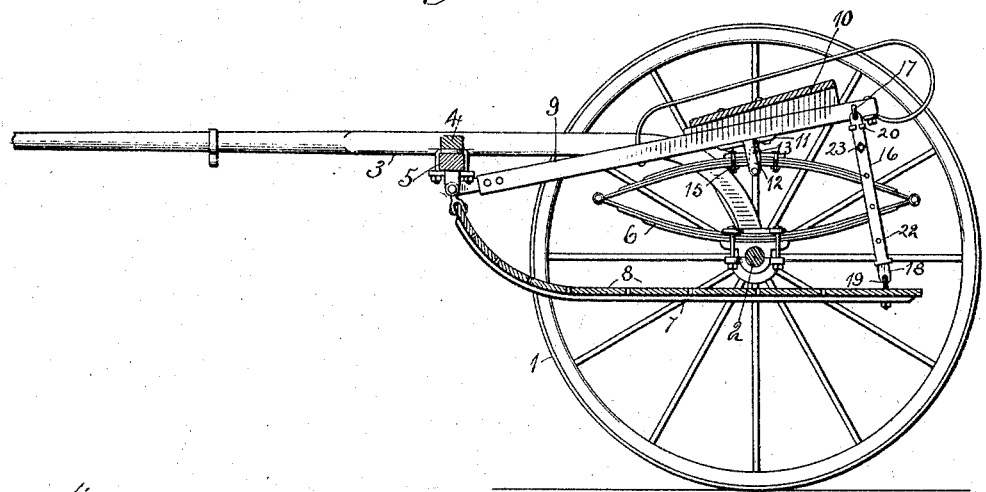
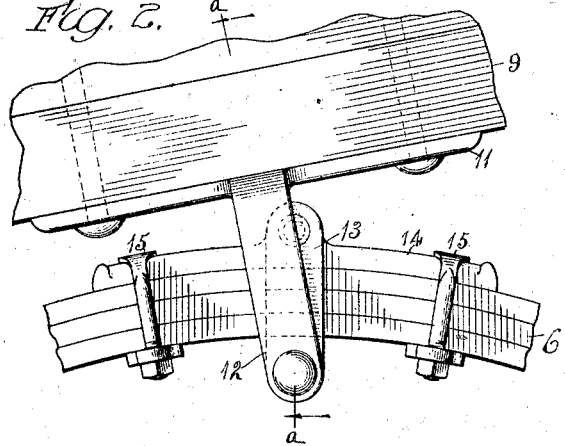
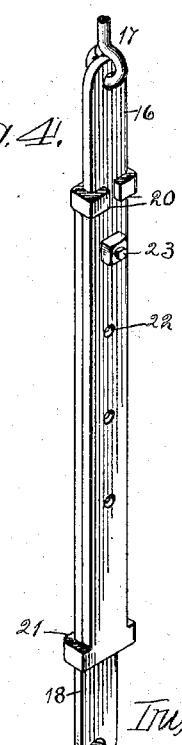
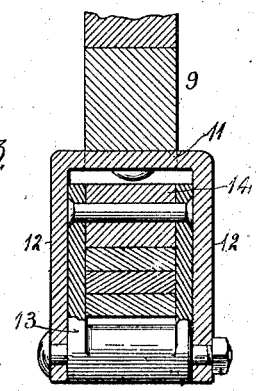
Witnesses:
Robert N. Weir
Harold G. Barrett
Inventor:
J. F. Whitman
By L. O. Bechel
Atty.

UNITED STATES PATENT OFFICE.

JOHN F. WHITMAN, OF BELVIDERE, ILLINOIS.

BREAKING-CART.

967,473.
Specification of Letters Patent.
Patented Aug. 16, 1910.

Application filed May 14, 1909. Serial No. 496,075.

*To all whom it may concern:*

Be it known that I, JOHN F. WHITMAN, a citizen of the United States, residing at Belvidere, in the county of Boone and State of Illinois, have invented certain new and useful Improvements in Breaking-Carts, of which the following is a specification.

The object of this invention is to form a connection between the seat supporting bars of a breaking cart and their supporting springs which will allow the springs to remain in their natural horizontal positions as the seat supporting bars rise and fall.

The further object of this invention is to form an adjustable connection between the seat supporting bars and the platform in order that the platform can be adjusted vertically different distances from the ground.

In the accompanying drawings, Figure 1 is a lengthwise vertical section through a breaking cart containing my improvements. Fig. 2 is an elevation of the spring connection with the seat support. Fig. 3 is a section on dotted line *a a* Fig. 2. Fig. 4 is a perspective view of one of the hangers connecting the seat support and foot rest.

The breaking cart in the main is of the usual construction. The wheels 1 support the axle 2 to which are connected the thills 3. A cross bar 4 connects the thills, and to which is connected the swingletrees 5. To the axle 2 are connected the elliptical springs 6. To the under face of the cross bar 4 are pivotally connected the supports 7, to the upper faces of which are secured the boards 8 forming the platform and foot rest. The platform extends in rear of the axle 2. To the forward ends of the supports 7 are pivotally connected supports 9 for a seat 10. To the under face of these seat supports 9 are secured brackets 11 provided with depending ears 12 between which is pivoted a swinging yoke 13 having a plate 14 pivoted to its upper end. This plate 14 rests on the upper face of an elliptical spring 6 and is connected thereby by the clamps 15.

As the points of connection of the plates 14 with the springs 6 move vertically when in use, and the points of connection of the brackets 11 with the seat supports move vertically and also horizontally, by the employment of the swinging yoke 13 there will be no binding between the spring and seat support, as the give and take is accomplished by the swinging yoke.

To the seat supports 9 are connected sections 16 by the eye bolts 17, and the sections 18 are connected to the platform 8 by the eye bolts 19. The sections 18 have lips 20 embracing the sections 16, and the sections 16 have lips 21 embracing the sections 19. The sections 16 are formed with openings 22 through any one of which a bolt 23 may pass, and which also passes through the sections 18 thereby clamping the sections together. By means of the bolt 23, and the holes 22, the sections of the support are made extensible in order that the platform may be supported different distances from the seat 10 to accommodate different height persons, or can be lowered near the ground in order that the driver may readily step upon it.

I claim as my invention.

1. In a breaking cart, a support, a spring mounted thereon, a movable seat having spaced ears that embrace the spring, and links embracing the springs and pivoted thereto and to the ears.

2. In a breaking cart, an axle and wheels supporting the same, draft means connected to the axle, springs mounted on the axle, a seat pivoted to the draft means and having depending ears embracing the springs, and a yoke pivotally mounted on the springs and embracing the same between the depending ears, said yoke being pivoted to said ears.

3. In a breaking cart, the combination with an axle, of a supporting frame mounted thereon, a swinging seat and a swinging platform mounted on the frame and respectively extending above and below the axle, and an adjustable connection between the seat and platform.

4. In a breaking cart, the combination with an axle and wheels supporting the same, of forwardly extending thills connected to the axle, a cross bar connecting the thills, springs mounted on the axle, a seat pivoted to the cross bar, links pivotally connecting the springs and the seat, a platform pivoted to the cross bar, and an extensible connection between the platform and seat.

In testimony whereof I have hereunto set my hand in presence of two subscribing witnesses.

JOHN F. WHITMAN.

Witnesses:
CLARA M. LUVELL,
MYRON D. PERKINS.